United States Patent [19]
Heltenburg

[11] Patent Number: 5,494,315
[45] Date of Patent: Feb. 27, 1996

[54] TRUCK BED BALLAST APPARATUS

[76] Inventor: Boyd Heltenburg, R.R. #2, Box 357, Bloomfield, Ind. 47424

[21] Appl. No.: 337,041

[22] Filed: Nov. 10, 1994

[51] Int. Cl.$^6$ ................................................ B60R 27/00
[52] U.S. Cl. ........................................ 280/759; 296/37.6
[58] Field of Search ................................ 280/759, 757, 280/758; 296/37.6, 37.1, 39.2

[56] References Cited

U.S. PATENT DOCUMENTS

| | | | |
|---|---|---|---|
| 3,727,971 | 4/1973 | Sisler | 296/37.6 |
| 3,888,507 | 6/1975 | Berghausen | 280/759 |
| 4,190,281 | 2/1980 | Chandler | 280/759 |
| 4,482,169 | 11/1984 | Yim | 280/759 |
| 4,796,914 | 1/1989 | Raynor | 280/759 |
| 5,080,418 | 1/1992 | Semple et al. | 280/757 |

Primary Examiner—Margaret A. Focarino
Assistant Examiner—Peter C. English

[57] ABSTRACT

A truck bed ballast apparatus includes a container assembly and a foot assembly adapted for connection to a truck bed. An inlet aperture is located on a wall of the container assembly. A quantity of sand can be added to the container assembly through the inlet aperture. A cover assembly covers the inlet aperture for retaining the sand inside the container assembly. The container assembly is adapted to be juxtaposed to a fender well projecting upward from the truck bed adjacent to a side wall of the truck bed. The foot assembly includes a plurality of apertures adapted to receive connectors for connecting the container assembly to the truck bed. In one embodiment, the container assembly includes a fender-well shaped outer portion adapted to fit over a fender well. With another embodiment, a first container assembly is placed over a first fender well; a second container assembly is placed over a second fender well; and a bracing element is connected between the first container assembly and the second container assembly. With yet another embodiment, a first container assembly is placed adjacent to a fender well rearward of the fender well; a second container assembly is placed adjacent to the fender well forward of the fender well; and a bracing element is connected between the first container assembly and the second container assembly over the fender well.

4 Claims, 4 Drawing Sheets

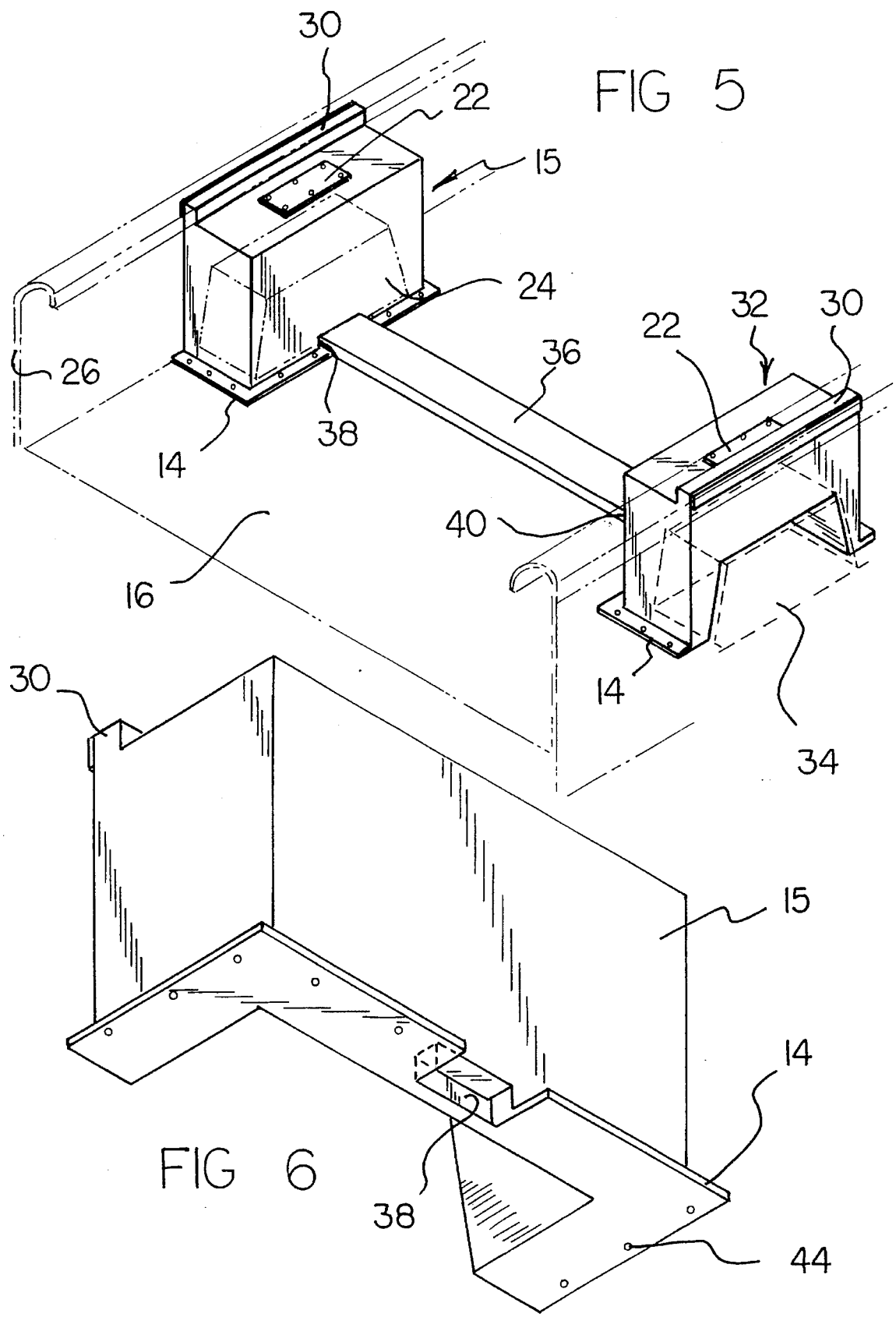

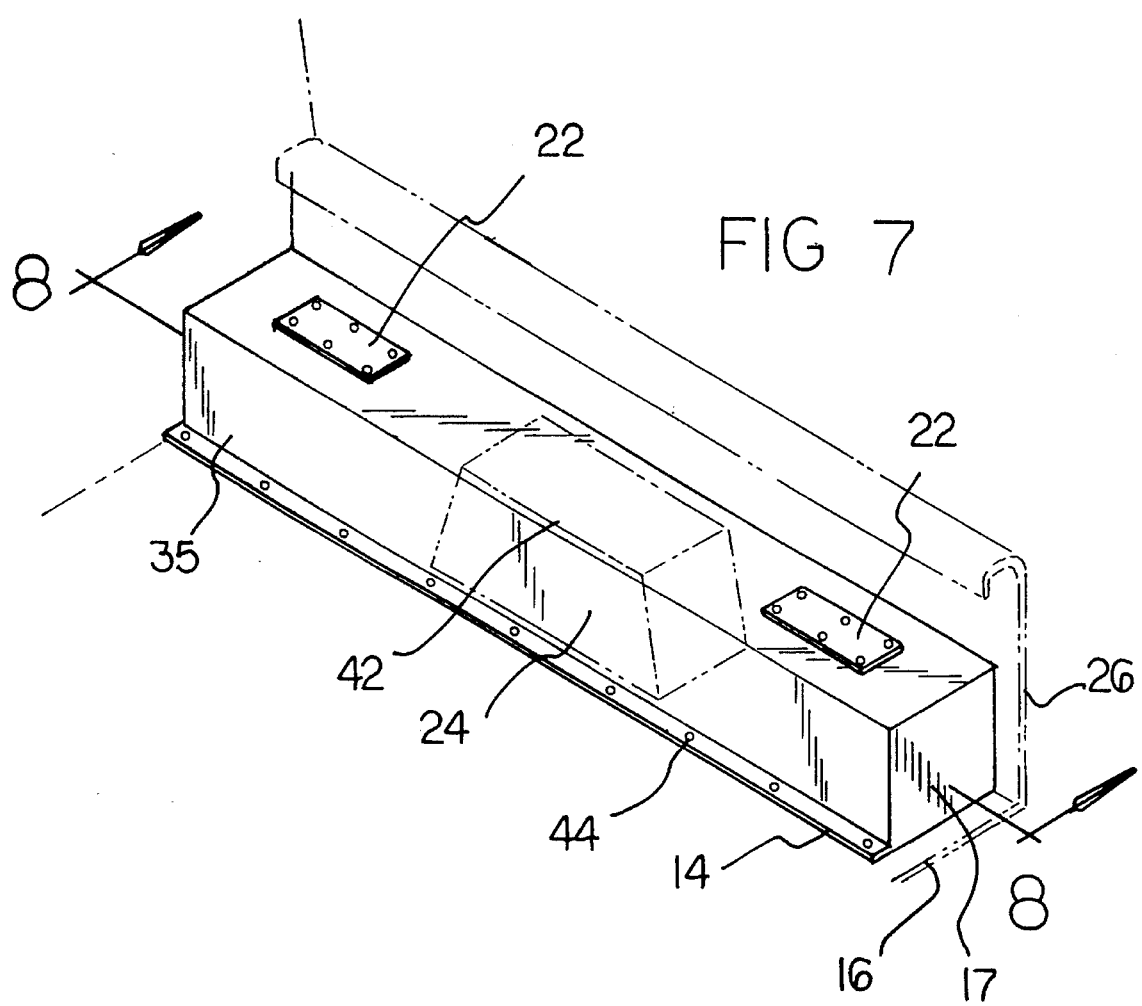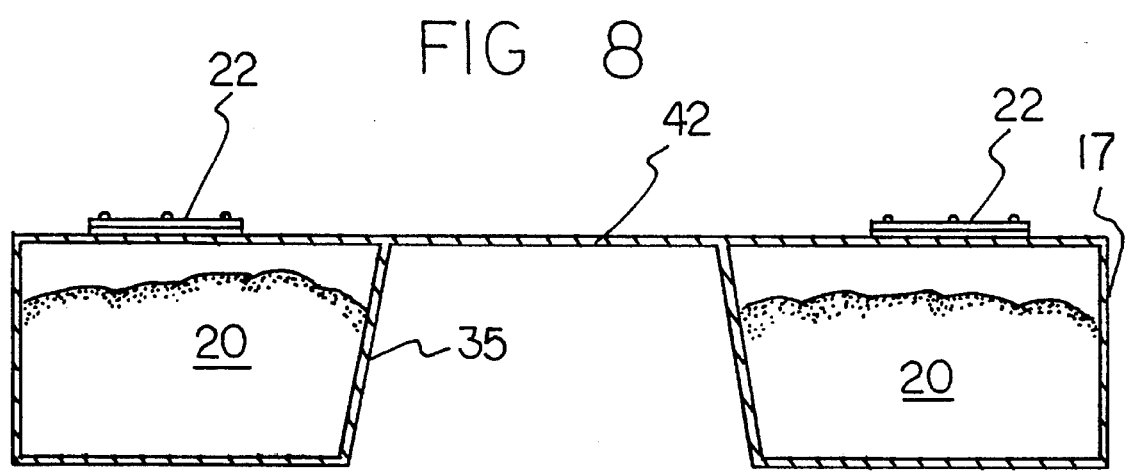

TRUCK BED BALLAST APPARATUS

BACKGROUND OF THE INVENTION

1. Field of the Invention

The present invention relates generally to ballast devices for truck beds and, more particularly, to ballast devices especially adapted for use in beds of pickup trucks.

2. Description of the Prior Art

Trucks generally have rear wheel drive, and when truck beds are empty, the weight over the rear wheels may be insufficient to provide adequate traction for the rear wheels. Throughout the years, a number of innovations have been developed relating to providing extra weight or ballast for truck beds, and the following U.S. patents are representative of some of those innovations: U.S. Pat. Nos. 3,888,507; 4,190,281; 4,482,169; 4,796,914; and 5,080,418. More specifically, U.S. Pat. No. 3,888,507 discloses a vehicle ballast weight assembly that employs a large, solid, prismic-like weight to provide ballast. By its very nature, the prismic-like weight is heavy and difficult to load and unload from the vehicle. In this respect, it would be desirable if a truck bed ballast apparatus were provided which does not employ a large, solid ballast weight.

U.S. Pat. No. 4,190,281 discloses a ballast device for a pickup truck. The device employs a container that is loaded with sand. The device is partially supported by the pickup truck bed and partially supported by the sidewall-associated structures adjacent to the pickup truck bed. The placement of this device in the pickup truck bed avoids the vicinity of the fender wells, and, at the same time, consumes some truck bed surface. To preserve the cargo carrying characteristics of the truck bed, it would be desirable if a ballast device for a pickup truck bed occupied a minimum amount of truck bed surface.

U.S. Pat. No. 4,482,169 discloses a ballast device for a pickup truck bed which utilizes a plurality of slidable lead weights. The weights are installed between fender wells and take up a consider amount of truck bed space. To avoid wasting the truck bed space between fender wells, it would be desirable if a ballast device did not occupy space on the truck bed between fender wells.

U.S. Pat. Nos. 4,796,914 and 5,080,418 each discloses a truck bed liner that includes a ballast chamber that is filled with a ballast liquid such as water. One disadvantage of each of these devices is that the entire contents of the truck bed must be emptied before the device is installed in the pickup truck bed. Another disadvantage of these devices is that each device must have very high structural strength to support the weight of loads placed in the truck bed. To have such very high strength, such ballast devices may be very heavy and expensive. Still another disadvantage of these devices is related to the fact that liquid water is used as the ballast. Therefore, the devices must remain water-tight to be useful. In these respects, it would be desirable if a ballast device for a truck bed does not require the entire contents of the track bed to be emptied before the device is installed. It would also be desirable if a truck bed ballast device did not support the weight of loads placed in the truck bed. It would also be desirable if a truck bed ballast device did not have to be water tight.

Still other features would be desirable in a truck bed ballast apparatus. For example, the fender wells of a pickup truck bed are regions in the truck bed in which bed floor space is essentially occupied and not available for load carrying. It is noted, that in a typical pickup truck bed, there is usually some empty space above the fender wells and adjacent to the side walls of the truck bed. Yet, because such empty space is not supported by the truck bed, such empty space is often under utilized or completely unused. Such empty space would be an ideal location for ballast for the truck bed. In this respect, it would be desirable to use empty space above the fender wells and adjacent to the side walls of a pickup truck bed to hold ballast for the pickup truck bed.

If one ballast device is installed above one fender well and another ballast device is installed above another fender well, it would be desirable for a lateral brace to be provided that extends between the two ballast devices.

Under certain circumstances, it may be desirable to install ballast devices directly on the pickup truck bed. Although this may take up a specific amount of truck bed space, such an installation would lower the center of gravity of the truck and provide greater stability for vehicle turns. Portions of the truck bed which are especially amenable for receiving ballast devices are adjacent to the fender wells and adjacent to the side walls of the truck bed both forward of and rearward of the fender wells. Moreover, when such ballast devices are installed both forward of and rearward of a fender well, it would be desirable for a bracing device to extend over the respective fender well between the adjacent ballast devices.

Thus, while the foregoing body of prior art indicates it to be well known to use ballast devices in truck beds, the prior art described above does not teach or suggest a truck bed ballast apparatus which has the following combination of desirable features: (1) does not employ a large, solid ballast weight; (2) provides a ballast device for a pickup truck bed that occupies a minimum amount of truck bed surface; (3) does not require the entire contents of the truck bed to be emptied before the ballast device is installed; (4) does not support the weight of loads placed in the track bed; (5) does not have to be water tight; (6) does not occupy space on the truck bed between fender wells; (7) uses empty space above the fender wells and adjacent to the side walls of a pickup truck bed to hold ballast for the pickup truck bed; (8) provides a lateral brace between two ballast devices when one ballast device is installed above one fender well and another ballast device is installed above another fender well; (9) provides ballast devices adjacent to the fender wells and adjacent to the side walls of the truck bed both forward of and rearward of the fender wells; and (10) provides a bracing device to extend over a respective fender well between the adjacent ballast devices installed forward of and rearward of the fender well. The foregoing desired characteristics are provided by the unique truck bed ballast apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a truck bed ballast apparatus which includes a container assembly and a foot assembly connected to the container assembly and adapted for connection to a truck bed. An inlet aperture is located on a wall of the container assembly. A quantity of sand can be added to the container assembly through the inlet aperture. A cover assembly is connected to the container assembly for covering the inlet aperture for retaining the quantity of sand inside the container assembly. The container assembly is adapted to be juxtaposed to a fender well projecting upward from the truck bed adjacent to a side wall of the truck bed.

The foot assembly includes a plurality of apertures adapted to receive connectors for connecting the container assembly to the truck bed. The container assembly includes a fender-well shaped outer portion adapted to fit over a fender well. A side-wall connector portion is connected to the container assembly and is adapted to connect to a top portion of a side wall of the truck bed.

A first container assembly is placed over a first fender well. A second container assembly is placed over a second fender well, and a bracing element is connected between the first container assembly and the second container assembly. The first container assembly includes a first brace-receiving portion. The second container assembly includes a second brace-receiving portion, and the bracing element is connected between the first brace-receiving portion and the second brace-receiving portion.

A first container assembly is placed adjacent to a fender well rearward of the fender well. A second container assembly is placed adjacent to the fender well forward of the fender well, and a bracing element is connected between the first container assembly and the second container assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved truck bed ballast apparatus which has all of the advantages of the prior art and none of the disadvantages.

It is another object of the present invention to provide a new and improved truck bed ballast apparatus which may be easily and efficiently manufactured and marketed.

It is a further object of the present invention to provide a new and improved truck bed ballast apparatus which is of durable and reliable construction.

An even further object of the present invention is to provide a new and improved truck bed ballast apparatus which is susceptible of a low cost of manufacture with regard to both materials and labor, and which accordingly is then susceptible of low prices of sale to the consuming public, thereby making such truck bed ballast apparatus available to the buying public.

Still yet a further object of the present invention is to provide a new and improved truck bed ballast apparatus which does not employ a large, solid ballast weight.

Still another object of the present invention is to provide a new and improved truck bed ballast apparatus that provides a ballast device for a pickup truck bed that occupies a minimum amount of truck bed surface.

Yet another object of the present invention is to provide a new and improved truck bed ballast apparatus which does not require the entire contents of the truck bed to be emptied before the ballast device is installed.

Even another object of the present invention is to provide a new and improved truck bed ballast apparatus that does not support the weight of loads placed in the truck bed.

Still a further object of the present invention is to provide a new and improved truck bed ballast apparatus which does not have to be water tight.

Yet another object of the present invention is to provide a new and improved truck bed ballast apparatus that does not occupy space on the truck bed between fender wells.

Still another object of the present invention is to provide a new and improved truck bed ballast apparatus which uses empty space above the fender wells and adjacent to the side walls of a pickup mack bed to hold ballast for the pickup truck bed.

Yet another object of the present invention is to provide a new and improved truck bed ballast apparatus that provides a lateral brace between two ballast devices when one ballast device is installed above one fender well and another ballast device is installed above another fender well.

Still a further object of the present invention is to provide a new and improved truck bed ballast apparatus that provides ballast devices adjacent to the fender wells and adjacent to the side walls of the truck bed both forward of and rearward of the fender wells.

Yet another object of the present invention is to provide a new and improved truck bed ballast apparatus which provides a bracing device to extend over a respective fender well between the adjacent ballast devices installed forward of and rearward of the fender well.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is a perspective view of a second embodiment of the invention.

FIG. 6 is an enlarged perspective view, viewed from below, of one of the truck bed ballast apparatuses shown in FIG. 5.

FIG. 7 is a perspective view of a third embodiment of the truck bed ballast apparatus of the invention installed in a truck bed.

FIG. 8 is an enlarged cross-sectional view of the embodiment of the invention shown in FIG. 7 taken along line 8—8 of FIG. 7.

DESCRIPTION OF THE PREFERRED EMBODIMENT

With reference to the drawings, a new and improved truck bed ballast apparatus embodying the principles and concepts of the present invention will be described.

Figure 1:
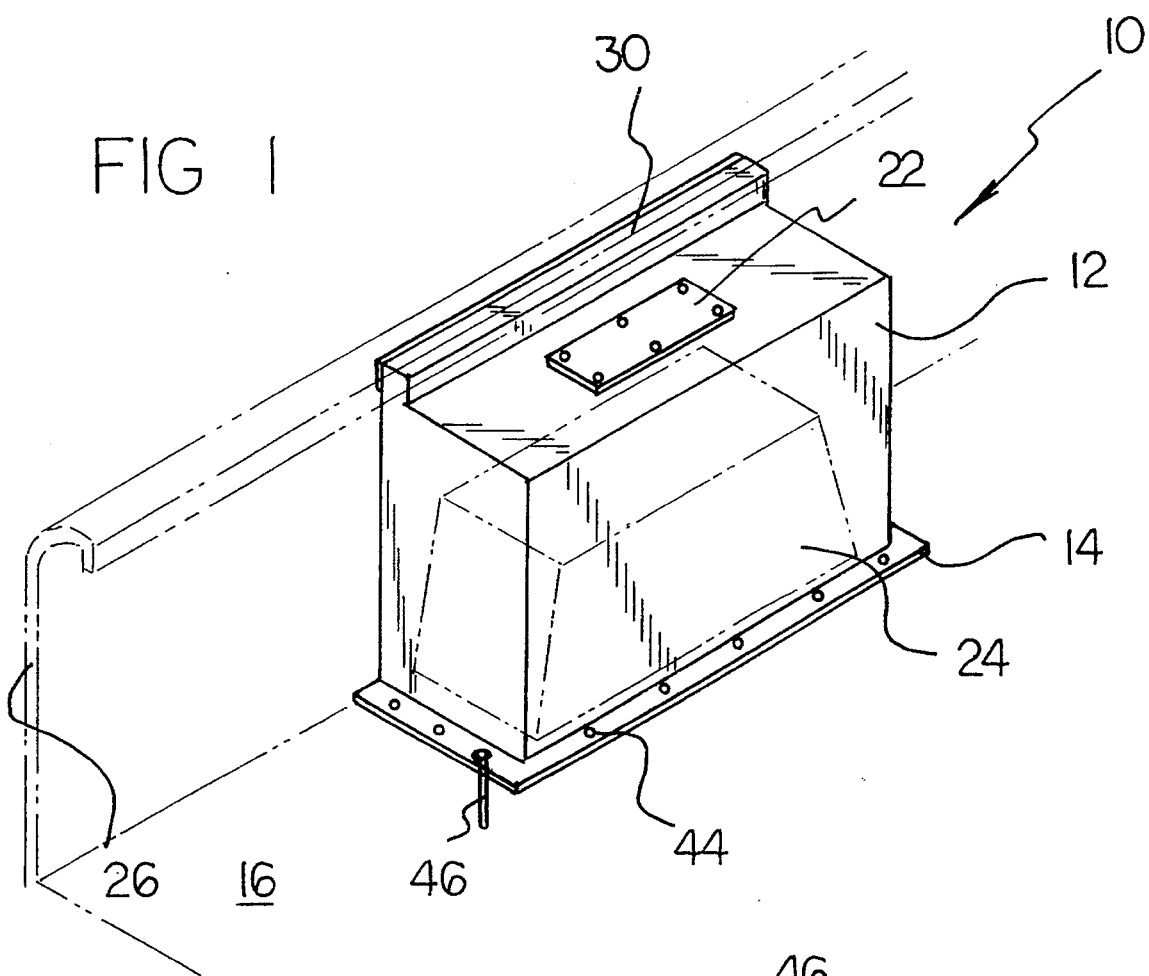
FIG. 1 is a perspective view showing a first preferred embodiment of the truck bed ballast apparatus of the invention installed over a fender well in a bed of a pickup truck.
Figure 2:
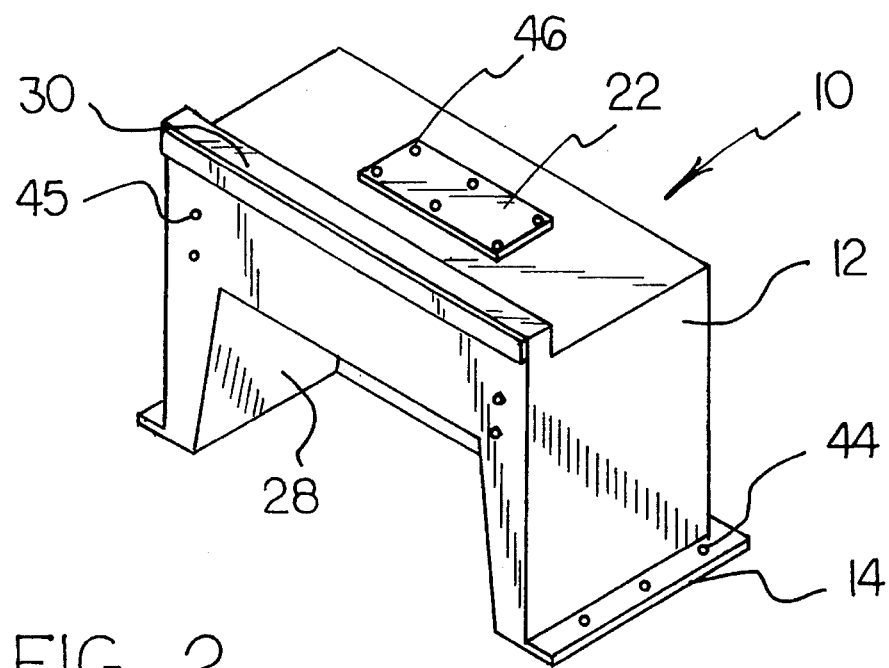
FIG. 2 is a perspective view of the embodiment of the truck bed ballast apparatus shown in FIG. 1 removed from the truck bed and rotated approximately 90 degrees.
Figure 3:
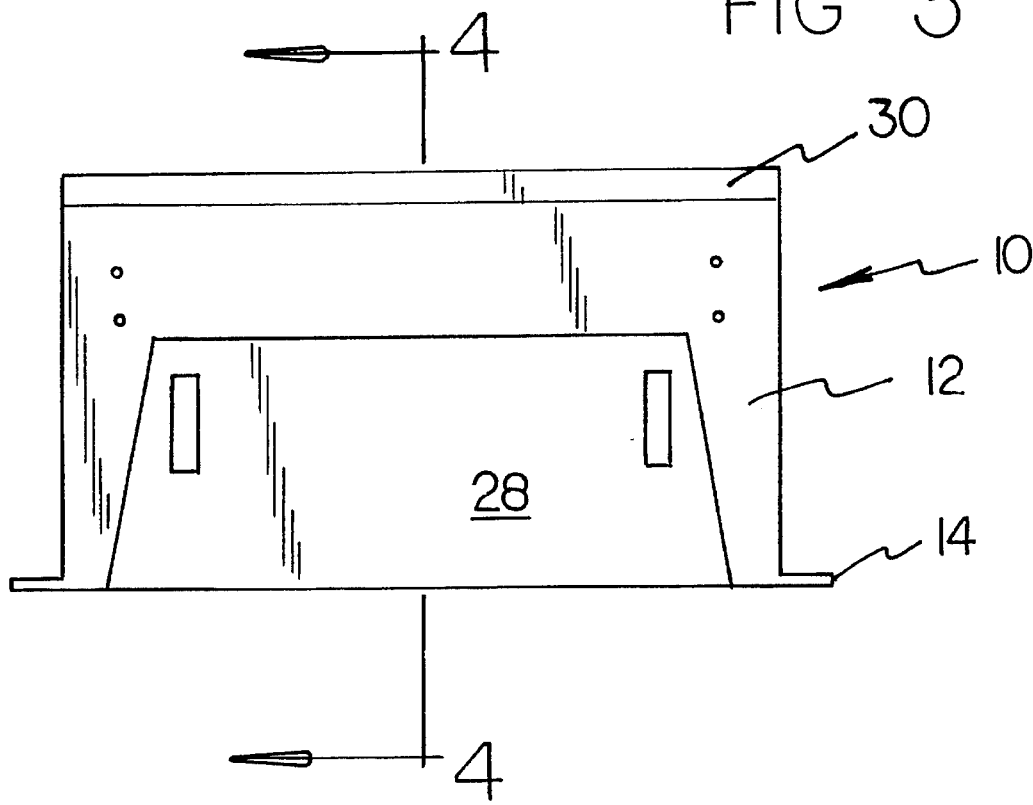
FIG. 3 is an enlarged rear view of the embodiment of the invention shown in FIG. 1 removed from the truck bed.
Figure 4:
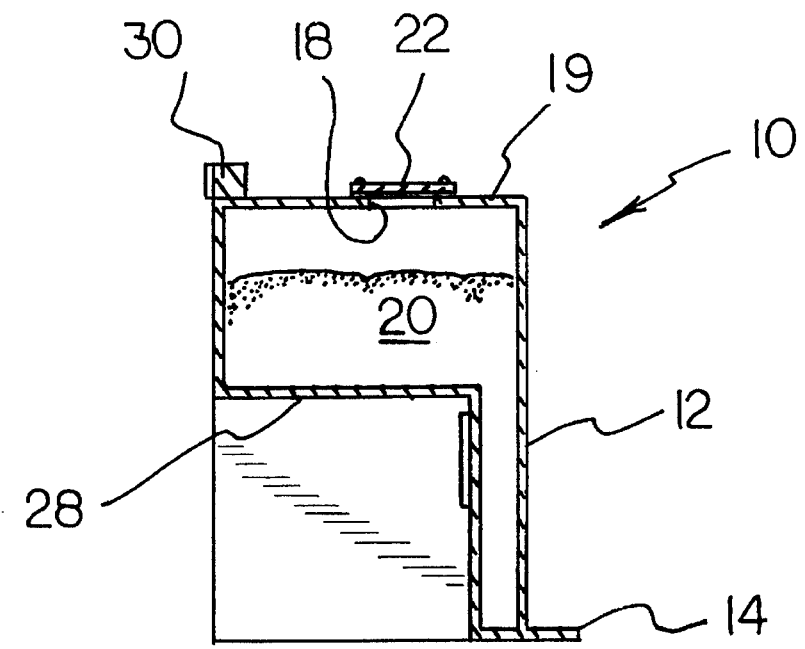
FIG. 4 is a cross-sectional view of the embodiment of the mack bed ballast apparatus of FIG. 3 taken along line 4—4 thereof.

Turning to FIGS. 1–4, there is shown an exemplary embodiment of the truck bed ballast apparatus of the invention generally designated by reference numeral 10. In its preferred form, truck bed ballast apparatus 10 includes a container assembly 12 and a foot assembly 14 connected to the container assembly 12 and adapted for connection to a truck bed 16. An inlet aperture 18 is located on a wall 19 of the container assembly 12. A quantity of sand 20 can be added to the container assembly 12 through the inlet aperture 18. A cover assembly 22 is connected to the container assembly 12 for covering the inlet aperture 18 for retaining the quantity of sand 20 inside the container assembly 12. The container assembly 12 is adapted to be juxtaposed to a fender well 24 projecting upward from the truck bed 16 adjacent to a side wall 26 of the truck bed 16.

The foot assembly 14 includes a plurality of apertures 44 adapted to receive connectors 46 for connecting the container assembly 12 to the truck bed 16. The connectors 46 can be bolts or screws. Connectors 46 can also be used to secure the cover assembly 22 to the container assembly 12. In addition, apertures 45 may be present in a side wall of a container assembly 12 for receiving connectors 46 for securing the container assembly 12 to a side wall 26 of the truck bed 16. The container assembly 12 includes a fender-well shaped outer portion 28 adapted to fit over a fender well 24. In this respect, a portion of the container assembly 12 occupies a portion of the space adjacent to the side wall 26 of the truck bed 16 above the fender well 24. A side-wall connector portion 30 is connected to the container assembly 12 and is adapted to connect to a top portion of a side wall 26 of the truck bed 16.

Turning to FIGS. 5–6, a second embodiment of the invention is shown. Reference numerals are shown that correspond to like reference numerals that designate like elements shown in the other figures. In addition, a first container assembly 15 is placed over a first fender well 24. A second container assembly 32 is placed over a second fender well 34, and a bracing element 36 is connected between the first container assembly 15 and the second container assembly 32. The first container assembly 15 includes a first brace-receiving portion 38. The second container assembly 32 includes a second brace-receiving portion 40, and the bracing element 36 is connected between the first brace-receiving portion 38 and the second brace-receiving portion 40.

Turning to FIGS. 7–8, a third embodiment of the invention is shown. Reference numerals are shown that correspond to like reference numerals that designate like elements shown in the other figures. In addition, a first container assembly 17 is placed adjacent to a fender well 24 rearward of the fender well 24. A second container assembly 35 is placed adjacent to the fender well 24 forward of the fender well 24, and a bracing element 42 is connected between the first container assembly 17 and the second container assembly 35.

In using an embodiment of the truck bed ballast apparatus 10 of the invention shown in FIGS. 1–4, a container assembly 12 is placed over a fender well 24. For the embodiment of the invention shown in FIGS. 5–6, the first container assembly 15 is placed over the fender well 24, and the second container assembly 32 is placed over the second fender well 34. Screws 46 are passed through apertures 44 in the foot assembly 14 and driven into the truck bed 16 for securing the respective container assembly in a position over the respective fender well. A side-wall connector portion 30 is used to connect the respective container assembly to a top portion of a side wall 26 of the truck bed 16. The respective cover assembly 22 is removed from its respective container assembly, and sand 20 is added through the inlet aperture 18 to the interior of the container assembly. The sand 20 serves as ballast weight over the respective rear wheels of the vehicle that are under the respective fender wells.

In the embodiment of the invention shown in FIGS. 7–8, the bracing element 42 is connected between the first container assembly 17 which is placed rearward of the fender well 24, and the second container assembly 35, which is placed forward of the fender well 24.

The components of the truck bed ballast apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved truck bed ballast apparatus that is low in cost, relatively simple in design and operation, and which may advantageously be used to provide a truck bed ballast apparatus which does not employ a large, solid ballast weight. With the invention, a truck bed ballast apparatus provides a ballast device for a pickup truck bed that occupies a minimum amount of truck bed surface. With the invention, a truck bed ballast apparatus is provided which does not require the entire contents of the truck bed to be emptied before the ballast device is installed. With the invention, a truck bed ballast apparatus is provided which does not support the weight of loads placed in the truck bed.

With the invention, a truck bed ballast apparatus is provided which does not have to be water tight. With the invention, a truck bed ballast apparatus is provided which does not occupy space on the truck bed between fender wells. With the invention, a truck bed ballast apparatus is provided which uses empty space above the fender wells and adjacent to the side walls of a pickup truck bed to hold ballast for the pickup truck bed. With the invention, a truck bed ballast apparatus provides a lateral brace between two ballast devices when one ballast device is installed above one fender well and another ballast device is installed above another fender well. With the invention, a truck bed ballast apparatus provides ballast devices adjacent to the fender wells and adjacent to the side walls of the truck bed both forward of and rearward of the fender wells. With the invention, a truck bed ballast apparatus provides a bracing device to extend over a respective fender well between the adjacent ballast devices installed forward of and rearward of the fender well.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners.in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A truck bed ballast apparatus, comprising:

a first container assembly, a foot assembly connected to said first container assembly and adapted for connection to a truck bed, an inlet aperture, located on a wall of said first container assembly, through which a quantity of sand can be added to said first container assembly, and a cover assembly, connected to said first container assembly, for covering said inlet aperture for retaining said quantity of sand inside said first container assembly, wherein said first container assembly is adapted to be juxtaposed to a fender well projecting upward from the truck bed adjacent to a side wall of the truck bed, wherein said first container assembly is placed over a first fender well, a second container assembly placed over a second fender well, and a bracing element connected between said first container assembly and said second container assembly, wherein said first container assembly includes a first brace-receiving portion, said second container assembly includes a second brace-receiving portion, and said bracing element is connected between said first brace-receiving portion and said second brace-receiving portion.

2. The apparatus of claim 1 wherein said foot assembly includes a plurality of apertures adapted to receive connectors for connecting said first container assembly to the truck bed.

3. The apparatus of claim 1 wherein said first container assembly includes a fender-well shaped outer portion adapted to fit over a fender well.

4. The apparatus of claim 1 further including:

a side-wall connector portion, connected to said first container assembly, adapted to connect to a top portion of a side wall of the truck bed.

* * * * *